Freeman H. Owens,
INVENTOR.

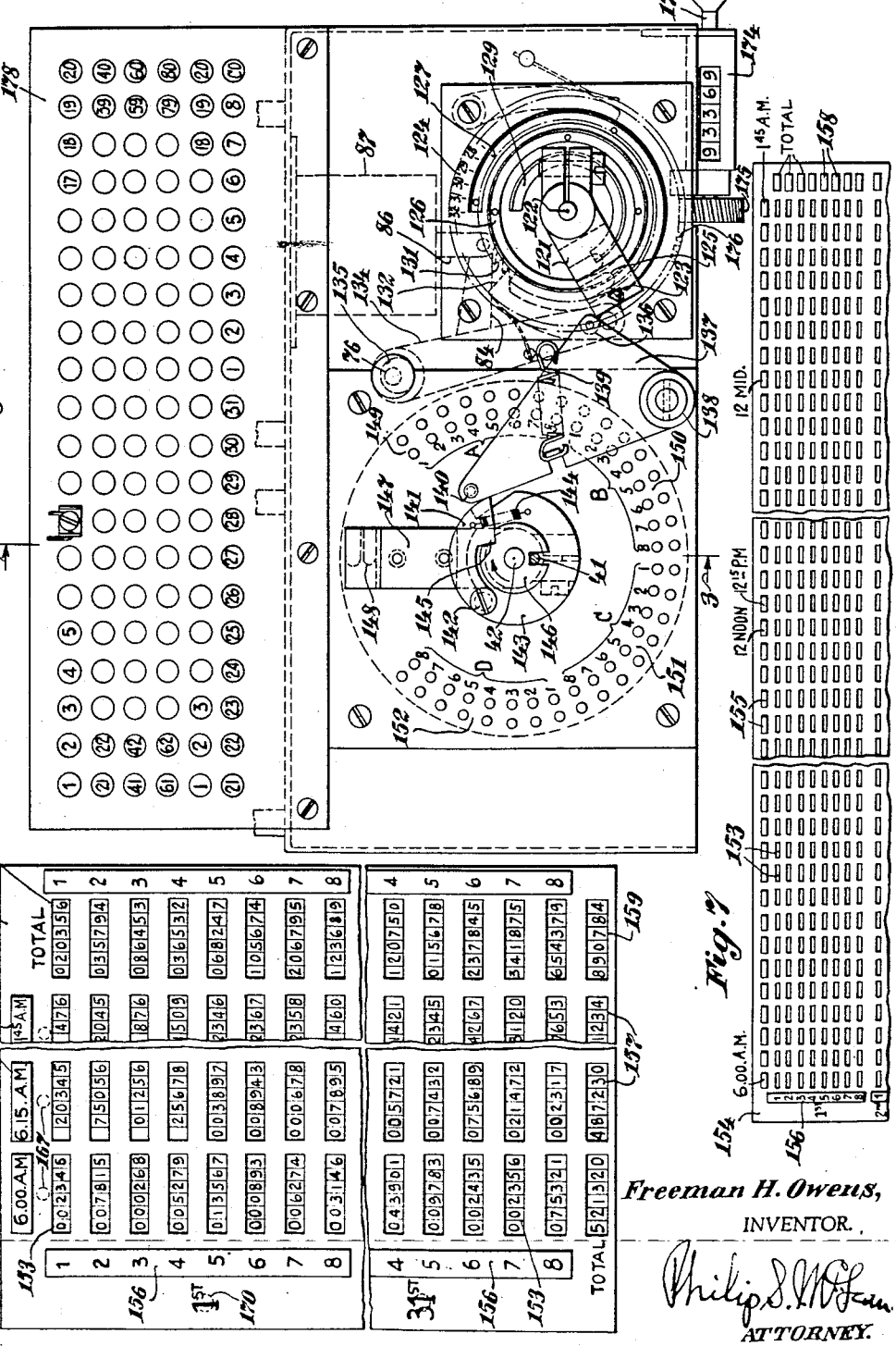

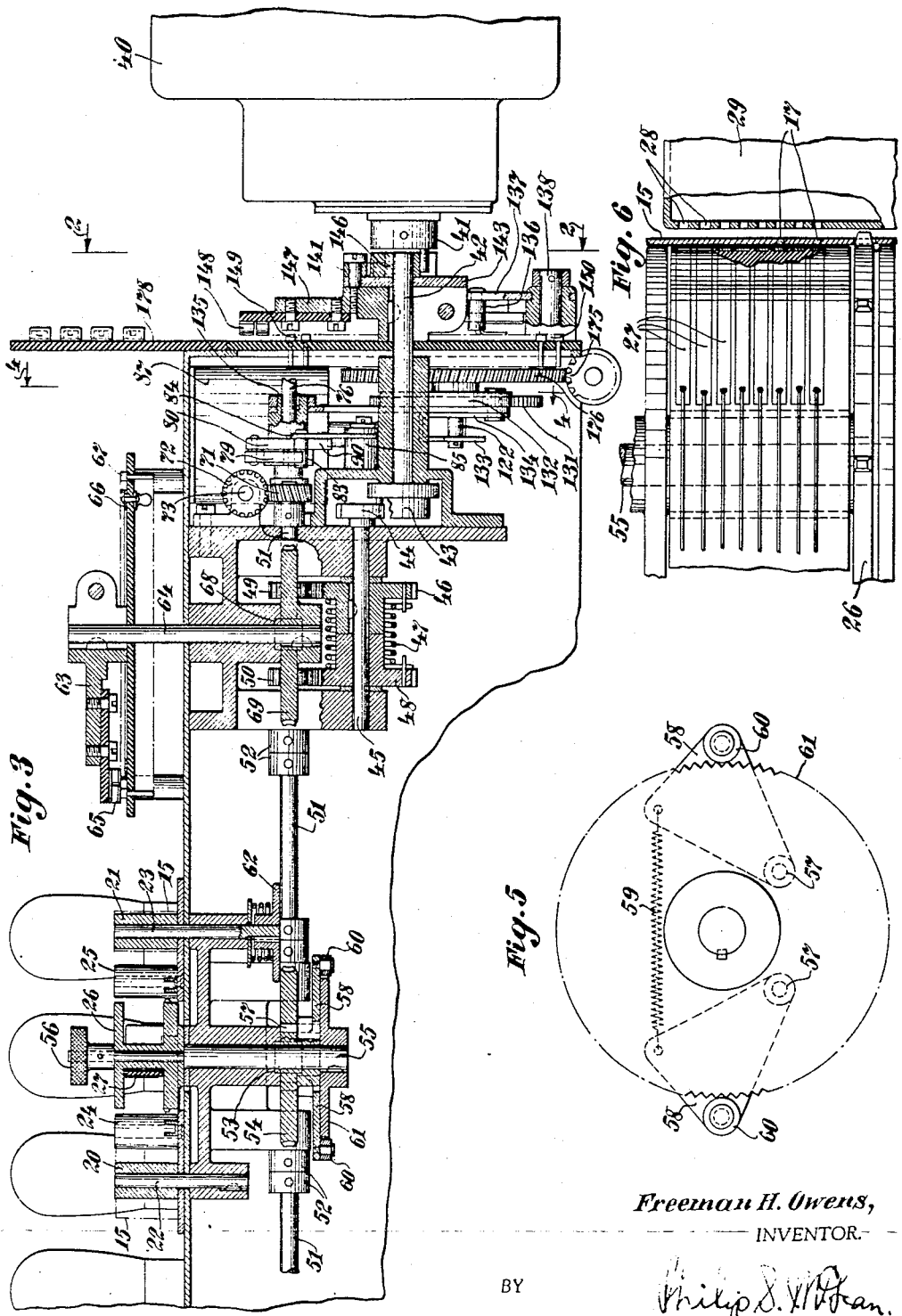

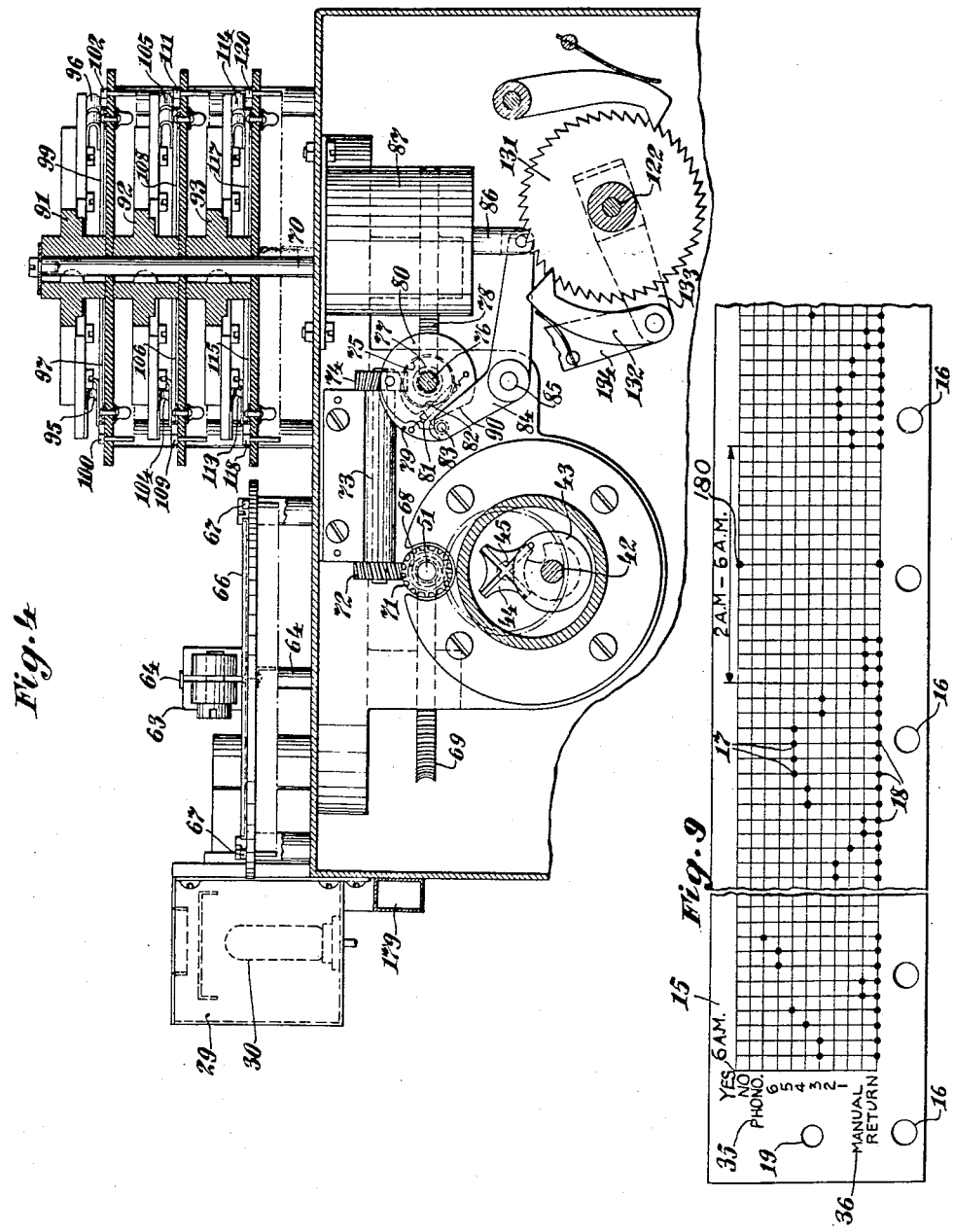

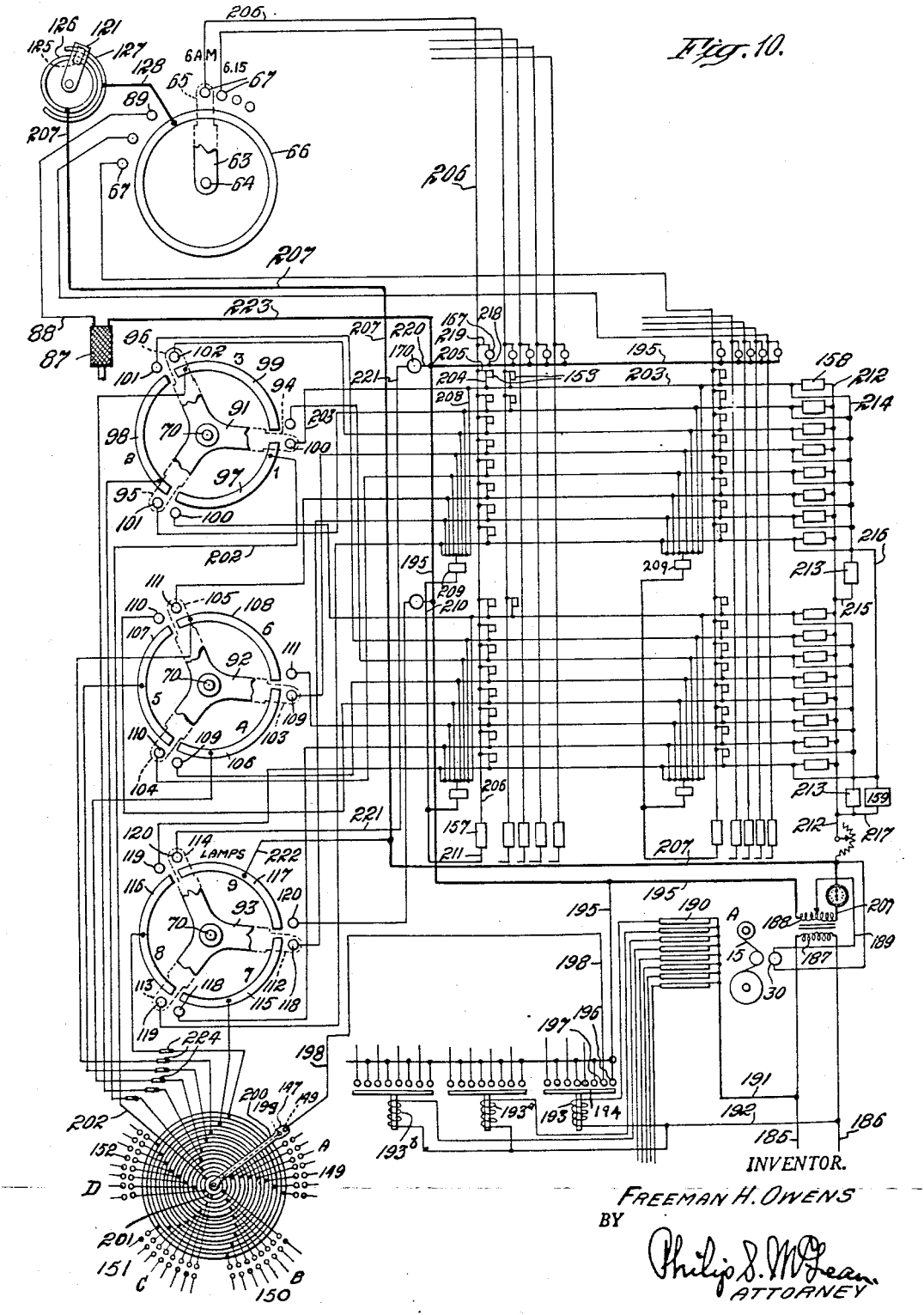

Aug. 21, 1951  F. H. OWENS  2,564,920
RECORD DECODING, TABULATION, AND ANALYSIS
Filed Dec. 6, 1944  6 Sheets-Sheet 6
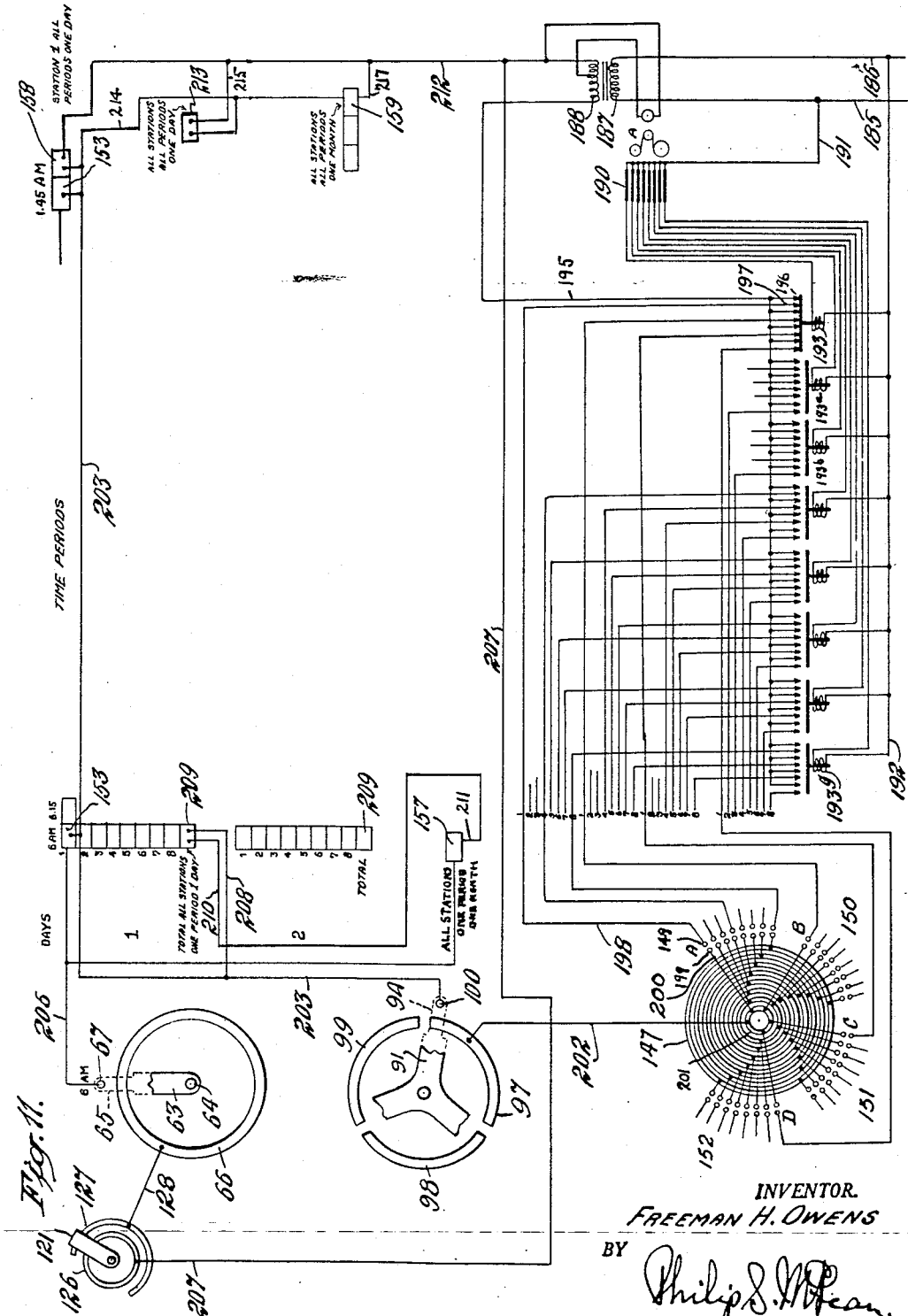
INVENTOR.
FREEMAN H. OWENS
BY
ATTORNEY Patented Aug. 21, 1951

2,564,920

UNITED STATES PATENT OFFICE 2,564,920

RECORD DECODING, TABULATION, AND ANALYSIS

Freeman H. Owens, New York, N. Y.

Application December 6, 1944, Serial No. 566,787

8 Claims. (Cl. 235—61.6)

1

The invention here disclosed relates to the decoding of records more or less comprehensive, inclusive or complicated in character.

The application for this patent is a continuation-in-part of copending application for patent Serial No. 423,129, filed December 16, 1941, and now abandoned.

In copending patent application Serial No. 397,504, filed June 10, 1941, issued as Patent No. 2,337,568 on December 28, 1943, there is disclosed apparatus for creating a continuous record of the different stations listened to on a radio receiving set.

The present invention provides a means for quickly and accurately assembling, tabulating and analyzing information to be gleaned from such records, for example, for comparing and determining the relative popularity of different programs or different transmitting stations.

Objects of the invention are to provide apparatus which will take different records, for instance, those made on the receivers of different listeners and will then automatically decode, assemble and portray the information furnished by such records in a form easily read and understood, showing for instance, by way of one example, the number of receivers on or off for any one period and hence any particular program, for any day or any number of days or an entire month or, by way of another example, the number of receivers on or off for any particular station or stations at any special period or periods throughout a day or number of days or for a whole continuous period, such as a month.

Further objects are to obtain results such as these, quickly, accurately and reliably and within reasonably simple structural requirements.

Further objects and the novel features of structure, combinations and relations of parts by which the purposes of the invention are attained, will appear in the course of the following specification.

The drawings illustrate a present practical embodiment of the invention. It is realized, however, that structure may be modified and changed in various ways, all within the true spirit and broad scope of the invention. The illustration therefore is to be considered primarily for purposes of disclosure and not by way of limitation, the actual scope of the invention being as hereinafter broadly defined and claimed.

Fig. 1 is a plan view, with parts broken away and appearing in section, of a form of apparatus for decoding records produced on different radio receivers;

2

Fig. 2 is a view of the right hand end of the apparatus shown in Fig. 1, omitting the motor and with the pin of the motor coupling appearing in section, as on substantially the plane of line 2—2 of Fig. 3;

Fig. 3 is a broken vertical sectional view of the apparatus as on substantially the plane of the line 3—3 of Fig. 2;

Fig. 4 is a broken vertical sectional view as on substantially the plane of line 4—4 of Fig. 3;

Fig. 5 is an enlarged bottom plan view of the two-way adjustable clutch for setting the records in coordinated relation in the machine;

Fig. 6 is a further enlarged broken part sectional detail of the electro-optical detector mechanism for reading and translating the record strip.

Fig. 7 is an illustration of one form of bulletin board for depicting results gleaned from the record tapes, with portions broken out for lack of space;

Fig. 8 is an enlarged detail showing portions of opposite ends of the board;

Fig. 9 is a broken plan of a portion of a record strip;

Fig. 10 is a wiring diagram.

Fig. 11 is a simplified or diagrammatic view of the essential parts of the complete system.

Figure 1:
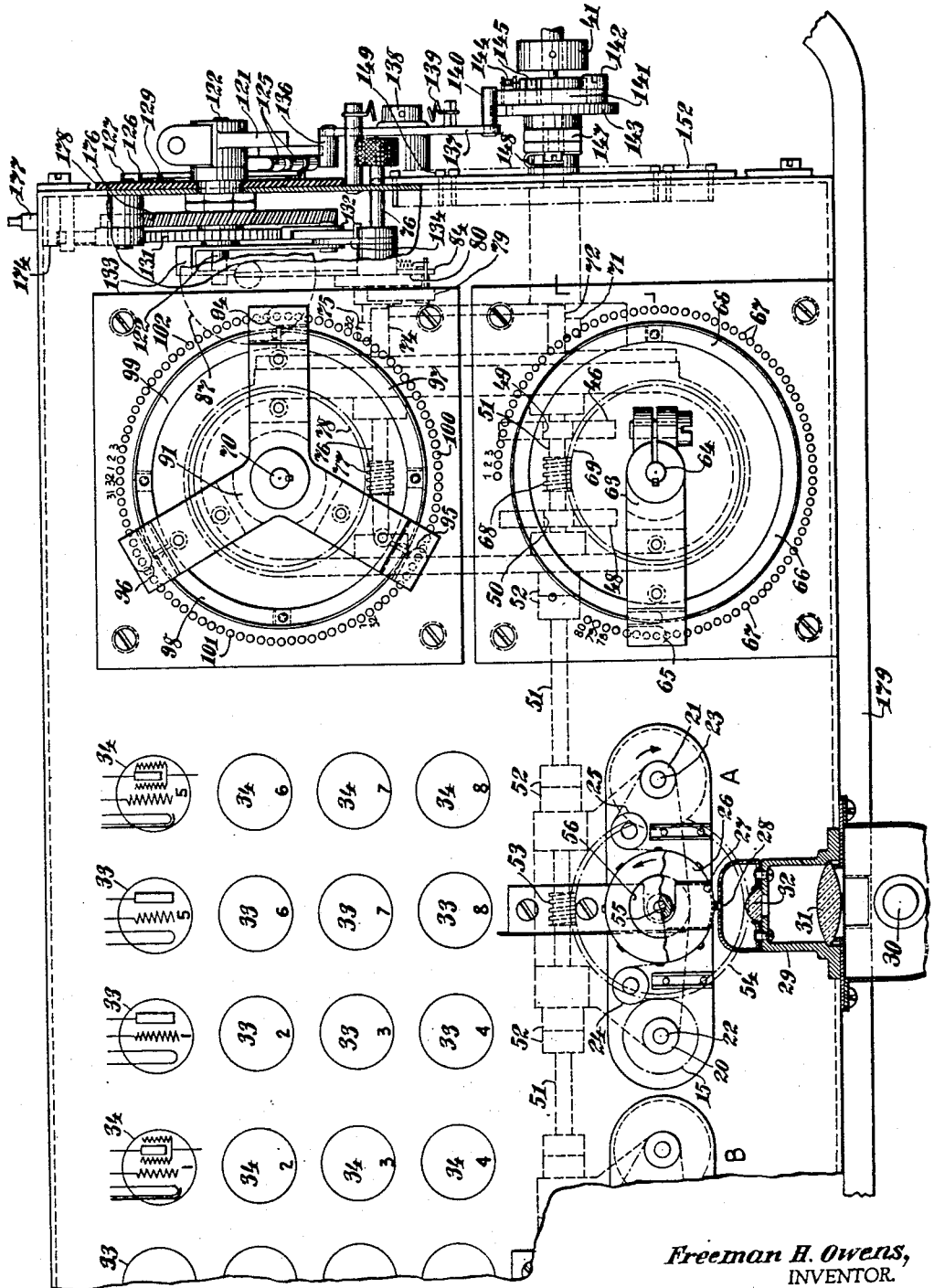

The records to be analyzed vary in accordance with the nature of the work. That shown in Fig. 9 is one such as produced in the automatic station recorder provided in the pretuned radio receiver disclosed in patent application Serial No. 397,504 (Patent No. 2,337,568, dated December 28, 1943) and consisting of a tape 15, perforated at 16, along one edge to fit the teeth of an intermittently acting broadcast period sprocket on the recorder and having perforations 17, 18 indicating stations or use of the set and produced by discharges through the tape from appropriately located electrodes. As shown, this tape may have a pilot hole 19, or equivalent marking for assuring proper placing in the recorder and subsequently in the decoder and it may be printed or otherwise marked to enable visual reading of the same, though the latter is not necessary, if the tape is simply to be put through the decoder.

In the illustration, the record strip is lined off transversely for 15 minute broadcast intervals, over a 24 hour period, but to reduce cost actual accounting may be kept of what would ordinarily be considered the used or active 20 hour period of from 6 a. m. in the morning to 2 a. m. of the next morning, making a total of eighty divisions for each day. The portion of tape illustrated, shows that the particular receiver with which this tape was used was off at 6 a. m., went on to station 3 at 6:15, continued on station 3 at 6:30, went on to station 4 at 6:45, to station 5 at 7, was set manually at 7:15, etc., and that it was off from 2:45 a. m. to 6 a. m. of the next morning.

Figs. 1 and 3 show how these tapes, representing the personal tastes of different listeners, are placed in the decoding machine by slipping the spools 20, 21, carrying such tapes, over spindles 22, 23, and passing a loop over guides 24, 25, and about an open center double-flanged scanning sprocket 26. Selenium, or other suitable light sensitive or electronic emission cells 27, Fig. 6, are disposed in the open center of this sprocket in back of the tape and opposite the light openings 28, in a multiple beam light housing 29, containing an exciter lamp 30, and suitable condensing lenses such as 31, 32, Fig. 1.

In a machine as here disclosed, with four scanning stations, A, B, C and D, the circuits may be arranged as shown in the wiring diagram, Fig. 10. Only the first two of these stations, A and B, appear in Fig. 1, each being there shown as having a first tube 33 and a relay or amplifier 34, constituting what may be considered essential elements of the scanning unit for each one of the stations or uses of the radio set—in the illustration, six radio stations, a phonograph or utility position 35, Fig. 9, and a manual setting position 36, making a total of eight. These eight scanning units comprising in the present instance some form of light sensitive cell 27 and suitable amplifying means such as represented by tubes 33, 34, for simplicity, are indicated by the blocks 190 in Fig. 10.

Mechanism for effecting step-by-step advance of the record tapes in accordance with the broadcast period spacing, is shown in Figs. 1, 3 and 4, as including a motor 40, which may have incorporated with it suitable speed reducing gearing and which through a pin coupling 41, operates a shaft 42, carrying the cam and pin element 43, of a Geneva gear combination, the star wheel 44, of the same being mounted on the end of an intermittently turning shaft 45. The latter is shown carrying a fixed gear 46, connected by spring 47, with a loose gear 48, to form a slack absorbing gear couple in mesh with pinions 49, 50, on the intermittent drive shaft 51. The latter forms a common drive for the four scanner units, being extended in sections as by couplings 52, and carrying worms 53, in mesh with worm gears 54, on upright shafts 55, on which the scanner sprockets 26 are fixed. Knobs or handles 56 are shown for turning these shafts and sprockets for the purpose of bringing all four records into register, this being permitted in the illustration, by provision of the worm gears 54 with pivot studs 57, on which are engaged levers 58, drawn together by springs 59, Fig. 5, said levers carrying rollers 60, engaging the toothed rims of discs 61, keyed on the lower ends of shafts 55, Fig. 5. The takeup roll spindles 23, Fig. 3, are frictionally driven by spring pressed flanges 62, on the lower ends of the same yieldingly engaged with worm gears 54.

Operated in synchronism with the record tapes is a broadcast period selecting switch shown in Figs. 1 and 3, as an arm 63, on the upper end of upright shaft 64, and carrying a brush 65 for connecting a current carrying ring 66 with the broadcast period contacts 67, said shaft being turned a step at a time, in the same manner as the sprocket shafts by a worm 68, on intermittent drive shaft 51, in mesh with worm gear 69 on said shaft 64. This gearing is such that the intermittent drive shaft 51 makes a single complete revolution for each step movement imparted to the sprocket shafts and to the broadcast switch shaft 64. The latter makes a complete revolution for each day of broadcasting periods. If a full twenty-four hour record of 15 minute broadcast intervals were kept, there would be ninety-six time contacts. For a twenty hour record as in the illustration, the time contacts run from 1 to 80 and the remaining sixteen intervals may be left blank or utilized for other purposes as indicated in Fig. 1.

The scanner, or scanners, if there be more than one, in conjunction with the synchronously operating period switch, thus provide a means for translating and delineating the information picked up by the records from different receivers for a full day's time.

To carry the operation along over a period of days, a special day-to-day or full month switch is provided, shown in Figs. 1 and 4, as consisting of an upright shaft 70, operated one step for each complete revolution of the single day shaft 64, and carrying brushes to cooperate each with a full month series of contacts for each so-called broadcast station (eight in this illustration).

The one step or one day movement of the month shaft 70, for each full revolution of the day shaft 64, is accomplished in the illustration by one-to-one gearing from intermittent drive shaft 51, consisting of helical gears 71, 72, cross shaft 73, and helical gears 74, 75, and a one revolution clutch from the latter gear to the shaft 76, Fig. 4, which carries the worm 77, in mesh with worm gear 78, on the lower end of shaft 70. By means of this clutch, shaft 70 is made to turn one step for each full revolution of shaft 76.

The one revolution clutch may be more or less conventional in design and is shown as consisting of a hook-shaped dog 79 pivoted on a flange 80, and tensioned by spring 81, Fig. 4, to engage a drive shoulder 82 on the hub of the helical gear 75 which is loosely mounted on shaft 76. The flange 80, carrying the clutch dog 79, is keyed or otherwise fixedly secured on shaft 76.

Normally, or for the greater part of the time, the dog 79 is held clear of the drive shoulder 82, as in Fig. 4, by stud 83 on one end of lever 84, pivoted at 85 and connected at the opposite end with the core 86 of solenoid 87. This solenoid, as shown at the left in the wiring diagram, Fig. 10, is connected by wiring 88 with a contact 89 in the available blank space at the end of the eighty time contacts 67, so as to be energized in one of the final step movements of the broadcast time brush 65, thus to let this clutch become engaged to impart one revolution to shaft 76 at the end of each full day travel of the broadcast time brush, it being noted that after the solenoid has been energized to drop the dog into clutched engagement with the shoulder 82 of driving gear 77, the pin 83, in revolution of the clutch flange 80, will drop into a recess 90 in that flange, to locate said pin in position to engage and declutch the dog at the end of the complete rotary movement of shaft 76. This complete revolution, through worm 77 and worm gear 78, will impart the single step movement to the month shaft 70.

The necessary month contacts for the eight broadcasting stations and for an additional signal light indication, are provided in the illustration by equipping the shaft 70 with three-armed spiders 91, 92, 93, one above the other, Fig. 4, the first carrying brushes 94, 95, 96, Fig. 10, for connecting segments 97, 98, 99, with individual day contacts 100, 101 and 102 as shown in Fig. 1, the second carrying brushes 103, 104, 105, Fig. 4, to connect segments 106, 107, 108, with contacts 109, 110, 111, Fig. 10, and the third carrying brushes 112, 113, 114, Figs. 4 and 10, for connecting segments 115, 116, 117 with contacts 118, 119, 120.

To set the machine for the full number of days in a month or for any lesser number of days, a switch arm 121, Fig. 2, is mounted on shaft 122 at the front of the machine, having a pointer 123 to register with the days of the month scale 124, said arm having a brush 125 for connecting a current supply ring 126 with an outer day segment 127 connected at 128, Fig. 10, with the broadcast time supply ring 66. As shown in Fig. 2, this limit switch may include an inner segment 129 for controlling the circuits of the excitor lamps 30 and the scanning devices.

This day limit switch is actuated step-by-step in time with the day-to-day or full month switch mechanism by means consisting of a ratchet 131 on shaft 122, engaged by pawl 132 carried by arm 133, pivoted on said shaft and oscillated by link 134 from the eccentric 135 on the single revolution shaft 76. This ratchet form of drive permits the pointer carrying switch arm 121, to be freely rotated righthandedly in Fig. 2, to locate it properly for stopping the machine for thirty-one or any lesser number of days.

Another function of the limit switch is to throw a clutch to prevent coasting. This feature is disclosed particularly in Fig. 2, where the switch arm 121 is shown advanced to engage a pin 136 on a lever 137, pivoted at 138, tensioned by a spring 139 and carrying a pin 140 to engage and trip a dog 141, pivoted at 142, on flange 143, keyed on motor driven shaft 42, and which dog is tensioned at 144 to engage a drive shoulder 145 of member 146, forming part of the pin coupling 41, and loosely mounted on shaft 42, Fig. 3.

With the construction last described, the machine may be set by switch arm 121, for computation of the desired number of days and at the end of that time, the brush on said switch arm will run off the contact segments to interrupt the main circuit and will also act through the lever 137 to trip the main drive clutch at 141 and thus prevent coasting or over-riding action.

The scanning of the tape to pick up the stations which may be recorded on the time divisions is effected in the illustration by a scanning switch made up of an arm 147, Fig. 2, on the constantly turning motor driven shaft 42, and carrying a brush 148 for successively connecting the pairs of contacts in the arcuately arranged groups 149, 150, 151, 152, for the four scanners respectively designated A, B, C, D.

In the present disclosure, the results of the decoding are indicated by electrically actuated counters represented at 153, Figs. 7, 8 and 10, one for each station or function (8), for each broadcast period (80), for each day of the month (31), or a total in this instance of 19,840. These may be grouped in any desired relation, all in one single continuous panel, or in various separate panels, such as one complete group for each day.

In the arrangement shown in Figs. 7 and 8 there is a single board 154 which may extend along one wall or about the several walls of a room, with the time designations along the top as at 155, in the eighty divisions for the twenty hour period from 6 a. m. to 1:45 a. m., the counters standing in vertical rows under these time headings in groups at 156, numbered 1 to 8, for all the stations, for a particular time of a particular day and these being repeated thirty-one times to cover all the days in any one month.

Totalizing counters 157, Fig. 8, at the bottom of the vertical rows provide the totals for all the stations for any one time for all the days of the month or the selected number of days counted. Similar counters 158, at the ends of the horizontal rows provide the totals for any one station for all periods for any day of the month, and a final counter 159, in the lower right-hand corner of the board provides the grand total of all stations and all periods for all days counted.

Operation

The records, in the present disclosure those produced on different radio receivers, as in patent application Serial No. 397,504 (Patent No. 2,337,-568) and showing by perforations 17, Fig. 9, the use or condition of those receivers at different broadcast times for successive twenty hour "days," for a full month, are placed in the machine, over the scanning sprockets 26, as indicated in Figs. 1 and 3, and registered as by turning adjusting knobs 56 one way or the other to locate the records at all four scanning stations A, B, C, D, at the same starting point. This registering action may be facilitated by special starting marks or indications on the tapes, and signal lights or the like may be provided to show when the records are synchronized, or special interlocking control may be provided to prevent starting of the machine until all records are properly synchronized.

The dwell provided after each movement of the Geneva gearing 43, 44, Figs. 3 and 4, provides the time necessary for the arm 147, Fig. 2, of the scanning switch to sweep over the eight sets of contacts 149 for the first scanner A, then over contacts 150 of scanner B and, in succession, over the contacts for scanners C and D. The blank interval shown at the top in Fig. 2 between the end of the D group of contacts and beginning of the A set of contacts, provides a short interval of time sufficient for the cam of the Geneva gearing to advance the star wheel to turn the sprockets for the next time division on the tapes. In the rest period the excitor lamp 30 at each scanner is projecting eight beams through the openings 28, Fig. 6, transversely across the tape so that if any perforations are present in the tape on that transverse time line, the correspondingly located light responsive cell 27 in back of the tape will be activated to energize the associated tubes 33 and 34, Fig. 1, to effect operation of the counter 153, Fig. 8, for that particular station, at that broadcast time, on that particular day.

With the parts properly synchronized, that is, for example, with the 6 a. m. time line on the record or records at rest at the scanning station or stations at the time when the brush 65 of the time switch is at rest on the 6 a. m. contact 67, circuits for actuating the counters may be established as shown in Fig. 10.

A local source of current supply is indicated at 185, 186, supplying energy to the primary 187 of a power transformer. The secondary 188 of this transformer has a section at one end connected by wiring 189 to supply the excitor lamps 30.

Assuming the record strip stopped at the first scanner A is perforated on the 6 a. m. transverse line, at the No. 1 broadcast station designating longitudinal line, the pick-up unit representing the No. 1 station and designated 190 in the wiring diagram, will be activated and through wires 191 and 192 connected with the mains 185, 186, will energize the solenoid 193 of the No. 1 station circuit closer; the solenoids 193a, 193b, etc. of the other seven circuit closers remaining deenergized. The actuated circuit closer, through its armature 194, closes four identical circuits for the four different scanners. Considering the first of these, that is the one for the A scanner, circuit will be through line 195 from one end of transformer secondary 188 to contact 196, armature 194, contact 197 and wire 198 to the No. 1 contact 149 of the A section of the scanner switch across the brush 148 to the contact 199, connected by wiring 200 at the back of the switch to the inner, No. 1 terminal ring 201. The latter is connected by wiring 202 with the No. 1 station segment 97 of the day switch. With the brush 94 of the switch arm 91 at that time in engagement with the first day of the month contact 100, the circuit will be continued through wiring 203, 204 to the counter 153 for the 6 a. m. period for the No. 1 station for the first day of the month, that is, counter 153 illustrated in the upper left-hand corner of Fig. 8, the circuit being completed by wiring 205, 206 to the 6 a. m. contact 67 of the 15 minute interval time switch, and by brush 65, ring 66, connection 128 to segment 127 of the limit switch and brush 125 to ring 126 and return line 207 to the other side of the secondary.

At this same time a circuit branched off from the line 203 at 208 will actuate a counter 209 at the foot of the 6 a. m. column for the first day, said counter being connected by wiring 210 with the 6 a. m. return line 206.

There will also be actuated at the same time the counter 157 at the foot of the thirty-one day column of 6 a. m. counters, this thirty-one day counter being connected at 211 in series with counters 209 and connected at the other side with the return line 206 through the 6 a. m. time contact.

Also at the same time, the counter 158 at the end of the first horizontal row of counters showing the full day total for the No. 1 station will be actuated from the supply line 203, it being connected at the other side through a common return line 212 to the other side of the transformer secondary 188.

Also at the same time, the counter 213 for registering the total of all the time periods for all the stations for the first day will be actuated through connection 214 from supply line 203 and connection 215 into the common return line 212.

Similarly, at the time under consideration, the final counter 159 for registering the total of all the periods for all the stations for the full month, will be actuated from supply line 203 through connections 214 and 216, with return through 217 into line 212.

Thus in the instance considered, the 6 a. m. counter 153 for the No. 1 station of the first day will be actuated; also counter 209 for the 6 a. m. total of that day, counter 157 for the month's total of the 6 a. m. periods of all stations, counter 158 for the day's total of the first station, counter 213 for the day's total of all the stations and counter 159 for the month's total for all periods of all stations.

To provide visual time of the day and day of the month signals, to facilitate following the action on the board, a time signal lamp 167 may be provided at the head of each time period column of counters (Fig. 8), and a day signal lamp 170 at the side of the group of counters for all the stations for each day.

As shown in Fig. 10, the time period signal lamp 167 is connected with the supply line 195 at 218 and by connection 219 into the return line 206 to the 6 a. m. time contact. The first day signal lamp 170 is connected with the supply line 195 by connection 220 and by connection 221 to the first day signal contact 120. The latter, at the time heretofore considered, is engaged by the brush 114 of the spider 93, so that the return circuit will be completed through the segment 117 and wiring 222, 207. Consequently, these signal lamps will be illuminated during that time that the switch arm 63 is in engagement with the 6 a. m. contact 67 and the switch arm or brush 14 is in contact with the particular day contact 120 independently of the scanning switch and during the time that the latter is completing the scanning cycle for that particular broadcast period of that particular day. These signal lights may be placed in back of suitably designated transparent panels or the like and may be either constant or of the flashing type. A preferred arrangement might be to have the day signal constant and the time signal at the head of the column flashing.

The operations described are completed in succession for each one of the scanners B, C and D and, as the scanning is completed at the last of these stations, the intermittent gearing steps the records at the scanning stations up to the next time period position and the brush 65 at the time switch up to the corresponding, next time period contact. As before mentioned, the gap between the contacts for scanning stations D and A provides the time at the constantly rotating scanner switch for this intermittent advancing movement to take place.

The day switch for the eight stations and for the light signals, as represented by switch arms 91, 92, 93 in Figs. 1 and 4, stands at rest during the entire eighty steps of movement of the intermittently operating time switch represented by switch arm 63. After completing this eighty step movement, the brush 65 carried by this switch arm, continuing, engages the before mentioned extra contact 89 to close circuit through wire 88 to solenoid 87 which is connected at 223 with the supply line 195 and with the return line 207 through ring 66, wire 128 and the limit switch 127, 125, 126. Thus energized, solenoid 87 drops the dog 79, Fig. 4, to clutch the helical gear 75 to shaft 76 for one revolution, thus to impart a one step movement to shaft 70 carrying the multiple switch arms 91, 92, 93, which then close circuits through the contacts 100, 101, 102, 109, 110, 111, 118 and 119 Fig. 10 for the next day for all eight of the stations, and through the contact 120 for the signal lamp 170 indicating that next day on the board.

The arm 121, Fig. 2, of the day limit switch is advanced a step for each step of the day of the month switch. Consequently, at the end of the period for which it has been set, anywhere from one to thirty-one days, the brush 125 will run off the ends of tracks 127 and 129, to interrupt the main circuit, which may include that for the drive motor 40, and the circuits for the exciter lamps 30. When this occurs, the lever 137 is pushed over to the left in Fig. 2, by the switch arm, to trip the dog 141 of the main drive clutch to prevent any coasting action. The day limit switch is shown as having 32 points instead of simply 31, covering a full month's operation, but this extra point is not necessary and is simply to make it accord with the number of divisions of the triple armed day of the month switches, which as shown in Fig. 1, for purposes of even division, have three sections each of 32 points for a complete circle of contacts. These extra thirty-second contacts may be used for extra signalling or indicating purposes.

The totalizing counters 157 for each time period, and 158 for each station, as well as the grand total counter 159, and any other totalizing or integrating counters are automatically stepped along to carry the proper count of the individual units or combinations of the same. The board therefore acts to portray a continuous, running computation of the records going through the machine and shows at any time individual and group totals, such as enumerated.

The results may be taken off for analysis or other purposes, as by copying down the figures, or by photographing particular sections of the board or the board in its entirety, or, if the counters be of the recorder type, by the records made by such devices.

While electric counters have been referred to as a suitable form of indicators, it is contemplated that other suitable more or less equivalent units may be employed.

The scanners may be of the photoelectric type, such as indicated, but with perforations of a proper design, as the markings in the records, the scanners may be of the brush type, adapted to close the counting circuits through openings, burned, punched or otherwise formed in the tapes.

While particularly useful for determining such things as the popularity of different radio stations, radio programs and the like, the invention has many other uses, one important one being the conducting of surveys of public sentiment on different questions. For the latter purpose, the recording instruments at the subscriber or listener stations could be simply "Yes" or "No" buttons, interlocked for operation of only one or the other for one time period, and arranged to form correspondingly recognizable perforations or other markings in the record tapes.

These preferential markings may be separate from or an added feature of the record tapes and indicators here shown.

While the time divisions on the tape would ordinarily be for broadcast periods, this may be varied, for instance, to show fractional periods, as when a listener might tune in a news commentator for the five minute interval usually allotted to such features. Instead of a tape, providing a continuous record over an extended period of time, such as a month, the record may be made on cards, covering, for instance, single days of operation. While usually preferable to print the time and station and possibly other indications on the record, to enable easy reading of the record direct, some or all such printing may be omitted in the interests of economy and the decoder relied upon entirely to furnish the information in intelligible form.

A counter for the number of records going through the machine is indicated at 174, Figs. 2 and 3, connected by four-to-one gearing 175, 176, with the intermittently actuated day-by-day time limit switch shaft 122, and adapted to be reset or returned to zero by a key 177, after the time limit switch arm 121 has been set for the number of days which the machine is to cover in its operation. This record counter may be conveniently located at the bottom of the instrument below the panel 178 carrying the various numbered wiring connections. The exciter lamps 30 may be protected from overheating by cooling air supplied through a duct or ducts 179 extending from a blower which may be operated from the drive motor.

Another present use of the invention, in the nature of the counting of votes above referred to, is the gathering of opinions of different programs, speeches and the like, and which is made possible by the provision of a button or buttons at the listener's station, which will create a marking or markings on the record tape, recognizable at the scanning station as expressing approval or disapproval of the listener and transcribed as such on the information board.

If desired, the information on the tape records may be transcribed to punched cards and those cards then run through existing machines for decoding such cards. Instead of perforating the tape by burning the openings therethrough, the tape may be perforated by suitable automatic punch mechanism.

If the records carry the "Yes" and "No" markings, correspondingly actuated indicator mechanism may be provided on the board or other special indicating means may be provided. For one example, special "Yes" and "No" cards may be automatically punched at the recording stations and these run through machines for computing such results, or the records with the "Yes" and "No" results may be run through the decoder just for the purpose of taking off the balloting results and these indicated on certain counters selected or provided for the purpose.

Special marks may be put on the record at some normally unused portions of the same, for example, at 3 a. m. or 4 a. m. as indicated at 180, Fig. 9, to serve as guides for accurately locating a record on the decoding machine. The counter mechanism may include suitable resetting or zeroizing means.

Suitable controls may be provided to enable taking off only selected portions of the information decoded. Thus, as shown in the wiring diagram, switches may be provided at 224 to enable cutting out certain of the stations at the scanning switch.

Fig. 11, in addition to illustrating more generally the relation of the various counters, shows how the first solenoid 193 will be energized from the first pick-up unit 190 of the scanner and when so energized will close four circuits as at 196, 197, for the No. 1 stations at the four sets of contact buttons 149 for the four groups A, B, C and D of the rotating scanning switch 147, etc.

Also, Fig. 11 shows how there are eight solenoids 193, 193a 193b, etc., one for each of the eight different broadcast stations, and arranged by the connections 198, 198a, 198b, etc., to set up circuits each for the particular station of that number at that particular station contact in the four groups A, B, C and D of such contacts at the scanner switch.

In the wiring diagram as illustrated in Figures 10 and 11, only one scanning member A is shown, however it is to be understood that multiple scanning members can be employed, one for each of the groups A, B, C and D within the meaning of the invention.

While of particular importance and disclosed in connection with radio, it will be recognized that the invention has many other uses and adaptations. The nature and form of the record which is to be decoded will vary, naturally, depending upon the particular field of operations, and such records may be produced in many different ways, such as optically, photographically, mechanically and electrically. Because of such possibilities the terms employed herein have been used in a descriptive rather than in a limiting sense, except where the intent of limited meaning is plain. Thus where in the present disclosure the operations of eight different broadcasting stations particularly are under consideration it will be realized that the intent of the invention is the decoding of any special operations, for example the voting or expressing of opinions, and in which instances a "Yes" or a "No" indication, for example, would be recorded at the tape instead of a station designation. Special counters may be connected up for such balloting or expressions of opinions, or certain of the counters, such as the 1 and 2 station counters here illustrated, might be set aside and utilized for such vote counting.

What is claimed is:

1. Decoding apparatus, comprising in combination, means for holding and for intermittently longitudinally advancing a record in steps corresponding to longitudinally spaced time divisions on such record, means for scanning said record in the rest periods of the same transversely for individual identifying markings in line with the time divisions of said record, counters corresponding to said identifying markings and for the different times represented by said time divisions on the record, circuit controlling means for said scanning means and counters including a time switch operating in step with said holding and intermittent record advancing means and having contacts corresponding to said time divisions on the record and a limit switch adjustable to determine operation of the apparatus for only a selected number of the time divisions.

2. Decoding apparatus, comprising in combination, means for holding and for intermittently longitudinally advancing a record in steps corresponding to longitudinally spaced time divisions on such record, means for scanning said record in the rest periods of the same transversely for individual identifying markings in line with the time divisions of said record, counters corresponding to said identifying markings and for the different times represented by said time divisions on the record, circuit controlling means for said scanning means and counters including a time switch operating in step with said holding and intermittent record advancing means and having contacts corresponding to said time divisions on the record and a limit switch adjustable to determine operation of the apparatus for only a selected number of the time divisions, a drive motor, drive connections therefrom to said means aforesaid and including a releasable coupling and means operable by said limit switch for effecting release of said coupling.

3. Apparatus for decoding records having markings of function distinctively spaced in one direction and spaced in relation to time in another direction, means for intermittently advancing said record in said time relation direction and in step with said spacing in relation to time, means for scanning said record for said markings in the intervals of rest between said step movements, a time switch having contacts corresponding to said time intervals on the record strip, means for intermittently actuating said time switch in synchronism with the step movements of said intermittent record advancing means, function counters for each of said time intervals conjointly controlled by said scanning means and associated synchronized switch means and total elapsed time control means adjustable to predetermine operation of the apparatus to cover any selected total period of time represented by the record.

4. In decoding apparatus, the combination of means for intermittently advancing a record tape in step-by-step relation, a selector switch having a succession of contacts, means for operating said selector switch in the same step-by-step relation, accounting devices, means for analyzing items on the record tape in the intervals of rest between said step-by-step movements of the same, means for conjointly actuating said accounting devices from said analyzing means and said selector switch and a limit switch operating in step-by-step synchronous relation with said selector switch and adjustable to predetermine the extent of operation of said apparatus.

5. In decoding apparatus, the combination of means for intermittently advancing a record tape in step-by-step relation, a time selector switch having a succession of fractional time contacts covering a predetermined period of time, means for operating said selector switch in the same step-by-step relation, accounting devices, means for analyzing items on the record tape in the intervals of rest between said step-by-step movements of the same, means for actuating said accounting devices conjointly from said analyzing means and said selector switch comprising an integrating switch having a succession of time period contacts connected with said accounting devices and means for intermittently operating said integrating switch a predetermined lesser number of steps than said selector switch, once for each time period covered by said succession of time contacts of said selector switch.

6. In decoding apparatus, the combination of means for intermittently advancing a record tape in step-by-step relation, a time selector switch having a succession of fractional time contacts covering a predetermined period of time, means for operating said selector switch in the same step-by-step relation, accounting devices, means for analyzing items on the record tape in the intervals of rest between said step-by-step movements of the same, means for actuating said accounting devices conjointly from said analyzing means and said selector switch comprising an integrating switch having a succession of time period contacts connected with said accounting devices, means for intermittently operating said integrating switch a predetermined lesser number of steps than said selector switch, once for each time period covered by said succession of time contacts of said selector switch and variable signal means connected with said accounting devices and under control of said integrating switch.

7. Decoding apparatus comprising in combination, counters for the different time periods of all of several different broadcast stations, means for scanning a record marked according to the stations that were on at a radio receiver at said different time periods and means for effecting actuation of the counters representing the different time periods for the respective stations in accordance with the time and station markings on the record scanned by said scanning means, and adjustable limit mechanism for setting the means aforesaid to cover only a selected length of time.

8. The decoding apparatus herein disclosed, comprising means for advancing a record marked transversely according to stations listened to and longitudinally according to time, means for scanning the record so advanced to determine stations listened to at succeeding time intervals, a scanning switch connected with said scanning means and having contacts corresponding to all stations recorded and operable to test all said station contacts in the interval of time taken by said scanning means to scan the station recordings for one interval of time, a time switch operating in synchronism with said scanning means and scanning switch and having time contacts corresponding to said time intervals and electric counters connected with the respective time contacts and arranged to show the stations listened to at the different time intervals in accordance with the markings on the record being scanned and means for presetting the period of time for which said record will be scanned.

FREEMAN H. OWENS.

REFERENCES CITED

The following references are of record in the file of this patent:

UNITED STATES PATENTS

| Number | Name | Date |
|---|---|---|
| 1,976,599 | Bryce | Oct. 9, 1934 |
| 2,043,295 | Lake | June 9, 1936 |
| 2,115,563 | Tauschek | Apr. 26, 1938 |
| 2,231,186 | Gould | Feb. 11, 1941 |
| 2,238,873 | Nelson | Apr. 15, 1941 |
| 2,254,932 | Bryce | Sept. 2, 1941 |
| 2,268,203 | Carpenter et al. | Dec. 30, 1941 |
| 2,295,000 | Morse | Sept. 8, 1942 |